(12) United States Patent
Kobayashi et al.

(10) Patent No.: US 7,758,020 B2
(45) Date of Patent: Jul. 20, 2010

(54) VALVE

(75) Inventors: Tomoyoshi Kobayashi, Toyota (JP); Norio Yamagishi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/283,683

(22) Filed: Nov. 22, 2005

(65) Prior Publication Data

US 2006/0071193 A1 Apr. 6, 2006

Related U.S. Application Data

(63) Continuation of application No. PCT/JP2005/004707, filed on Mar. 10, 2005.

(30) Foreign Application Priority Data

Mar. 12, 2004 (JP) .............................. 2004-071078

(51) Int. Cl.
*F16K 1/36* (2006.01)

(52) U.S. Cl. ........................ 251/333; 251/363; 251/364; 251/900; 277/586; 277/587

(58) Field of Classification Search ................. 251/333, 251/900, 332, 122, 210, 330, 359, 363, 364; 222/332, 333, 900; 277/586, 587

See application file for complete search history.

(56) References Cited

U.S. PATENT DOCUMENTS

| | | | | |
|---|---|---|---|---|
| 1,217,725 A * | 2/1917 | Eckenroth | .................... | 251/210 |
| 2,403,777 A * | 7/1946 | Yanka | .......................... | 251/210 |
| 3,263,961 A * | 8/1966 | Varga | .......................... | 251/332 |
| 3,409,039 A * | 11/1968 | Griffin | .................... | 137/516.29 |
| 4,909,288 A * | 3/1990 | Sommer et al. | ............. | 141/232 |
| 5,172,716 A * | 12/1992 | Paptzun | .................. | 137/115.05 |
| 5,188,150 A | 2/1993 | Esplin | | |
| 5,452,738 A | 9/1995 | Borland et al. | | |
| 5,671,903 A | 9/1997 | Homma et al. | | |
| 7,036,790 B2 * | 5/2006 | Kajitani | ...................... | 251/122 |
| 2003/0151018 A1 | 8/2003 | Teshima et al. | | |
| 2004/0089836 A1* | 5/2004 | Wu | .......................... | 251/326 |

FOREIGN PATENT DOCUMENTS

DE 680 682 9/1939

(Continued)

*Primary Examiner*—J. Casimer Jacyna
(74) *Attorney, Agent, or Firm*—Oliff & Berridge, PLC (57) ABSTRACT

A valve in which durability of a sealing member made from an elastic material can be increased and sealing capability can be advantageously maintained over a wide range from a large differential pressure to a low differential pressure. A valve (100), in which a valve disc (1) and a valve seat (2) are brought into close contact via a sealing member (5) composed of an elastic material and provided at the valve disc (1) or valve seat (2), comprises a throttle section (30) defined by the shape of at least one of the valve disc (1) and valve seat (2). The throttle section (30) narrows a flow passage formed between the valve disc (1) and valve seat (2) and is provided near the sealing member (5). The flow passage narrowed by the throttle section (30) is so set that narrowing preferentially proceeds in the flow passage in close proximity to the sealing member (5) during the closing operation of the valve disc (1).

16 Claims, 10 Drawing Sheets

FOREIGN PATENT DOCUMENTS

| | | |
|---|---|---|
| JP | 03-505907 A | 12/1991 |
| JP | 04-111966 U | 9/1992 |
| JP | 05-073368 U | 10/1993 |
| JP | 07-201758 A | 8/1995 |
| JP | 07-253170 A | 10/1995 |
| JP | 08-210733 A | 8/1996 |
| JP | 09-324862 A | 12/1997 |
| JP | 11-101360 A | 4/1999 |
| JP | A-2000-249233 | 9/2000 |
| JP | 2000-283321 A | 10/2000 |
| JP | 2003-161375 A | 6/2003 |
| JP | 2003-240149 A | 8/2003 |
| JP | 2003-269642 A | 9/2003 |
| JP | A-2004-340344 | 12/2004 |
| WO | WO 89/12192 | 12/1989 |
| WO | WO 02/12766 A1 | 2/2002 |

* cited by examiner

VALVE

This is a Continuation of International Application No. PCT/JP05/004707 filed Mar. 10, 2005, which claims the benefit of Japanese Patent Application No. 2004-071078 filed Mar. 12, 2004. The entire disclosure of the prior application[s] is hereby incorporated by reference herein in its entirety.

BACKGROUND

The present invention relates to a valve for installation in high-pressure gas piping systems, for example, in fuel cell systems, in which a valve disc and a valve seat are brought into close contact via a sealing member composed of an elastic material and provided on one of them.

Valves in which a sealing member composed of an elastic material such as rubber is disposed on either a valve disc or a valve seat is known as the conventional valve designed for high-pressure fluids (for example, see Japanese Patent Laid-open Publication No. 2003-240149 (Page 4 and FIG. 2) and Japanese Utility Model Laid-open Publication No. H5-73368 (Page 9 and FIG. 2). Among such valves, in pilot electromagnetic valves described in Japanese Patent Laid-open Publication No. 2003-240149, in which the sealing member is disposed on the valve seat, the sealing member and valve disc are so formed that the sealing member pressed by the high-pressure fluid when the valve disc is open will not be damaged by the deformation in the flow direction of the fluid.

However, in such conventional valves, if a state is assumed with a large difference in pressure between the primary side and the secondary side, when the valve is opened, the fluid rapidly flows to the secondary side and a large force is rapidly applied by the fluid to the sealing member. The resultant problem is that the sealing member, which is an elastic substance, easily undergoes large deformation that easily leads to loss of durability.

Increasing hardness of the sealing member is apparently the simplest way to resolve the above-described problem. However, if a state is assumed in which the difference in pressure between the primary side and secondary side is small, the force applied to the sealing member when the valve is closed is insufficient and this time the sealing capability is easily lost.

SUMMARY

It is an object of the present invention to provide a valve in which durability of a sealing member made from an elastic material can be increased and sealing capability can be advantageously maintained over a wide range from a large differential pressure to a low differential pressure.

To attain the object, the present invention provides a valve in which a valve disc (element) and a valve seat are brought into close contact via a sealing member composed of an elastic material (substance) and provided at the valve disc or valve seat. This valve comprises a throttle section defined by the shape of at least one of the valve disc and valve seat and narrowing a flow passage formed therebetween. The throttle section is provided near the sealing member.

With such a configuration, the force of the fluid acting upon the sealing member is relaxed, because the throttle section provided near the sealing member causes pressure loss in the fluid. As a result, even in the case of a high difference in pressure between the primary side and secondary side, durability of the sealing member can be advantageously increased. Another result is that sealing capability can be maintained over a wide range from a high differential pressure to a low differential pressure, while maintaining the degree of freedom in designing the properties such as hardness of the sealing member.

Here, any one or two of the locations upstream and downstream of the sealing member are included in the "near the sealing member". For example, when the sealing member has an annular shape, the throttle section is provided near the sealing member by disposing the throttle section either or both of on the inner side and outer side in the radial direction of the sealing member.

The throttle section can be defined by the shape of only one of the valve disc and valve seat, or by establishing the relationship between the shapes of the two.

The valve according to the present invention is applicable to both the direct operated systems and the pilot systems, and the operation system thereof may be manual or based on a variety of actuators. For example, an electromagnetic valve can be obtained.

In one preferred mode for carrying out the invention, the flow passage narrowed by the throttle section is so set that narrowing preferentially proceeds in the flow passage in close proximity to the sealing member during the closing operation of the valve disc.

With such a configuration, during the closing operation of the valve disc, a sufficient pressure loss is generated and durability of the sealing member is advantageously increased. Meanwhile, when the valve is opened, pressure loss is effectively avoided and a sufficient (prescribed) flow rate can be ensured in the inner flow passage of the valve.

Another valve according to the present invention is a valve in which a valve disc and a valve seat are brought into close contact via a sealing member composed of an elastic material and provided at the valve disc or valve seat. This valve comprises a flow passage leading from an inflow port to an outflow port through the location of the sealing member, and a pressure loss section provided in close proximity to the sealing member and impeding the flow of the fluid by partially reducing the cross section area of the flow passage.

With such a configuration, the force of the fluid acting upon the sealing member is relaxed, in the same manner as described above. As a result, even in the case of a high difference in pressure between the primary side and secondary side, durability of the sealing member can be advantageously increased.

In this case, it is preferred that the pressure loss section reduces partially and gradually the cross section area of the flow passage following the movement of the valve disc in the closing direction.

In those cases, it is preferred that the pressure loss section is defined by the shape of the valve disc and/or the valve seat.

Yet another valve according to the present invention is a valve in which a valve disc and a valve seat are brought into close contact via an annular sealing member composed of an elastic material and provided at the valve disc or valve seat. The valve disc comprises a first surface facing the valve seat, and a first peripheral surface connected to the first surface. The valve seat comprises a second surface facing the first surface, and an annular protrusion protruding from the second surface toward the first peripheral surface in a position facing the first peripheral surface. The sealing member is provided at one of the first surface and the second surface and configured so that it can be brought into close contact with the other of the first surface and the second surface. A flow passage between the first peripheral surface and the annular protrusion comprises a flow passage that is set to have a cross section area that is reduced with respect to that of a flow passage between the first surface and the second surface.

Preferably, in the flow passage that is set to have a reduced cross section area, the ratio of reduction of the cross section that follows the closing operation of the valve disc is larger than that in the flow passage between the first surface and the second surface.

Preferably, the annular protrusion has a second peripheral surface that is connected to the second surface and can face the first peripheral surface. The flow passage that is set to have a reduced cross section area is at least part of the flow passage between the first peripheral surface and the second peripheral surface.

Further preferably, the first peripheral surface is composed of a tapered peripheral surface and the peripheral surface is composed of an inversely tapered peripheral surface inclined toward the valve disc.

More preferably, the relationship $R_1 > R_2$ is satisfied, where $R_1$ stands for a distance to the crossing section of the first surface and the tapered peripheral surface and $R_2$ stands for a distance to the crossing section of the second surface and the inversely tapered peripheral surface.

Preferably, the relationship $\theta_1 > \theta_2$ is satisfied, where $\theta_1$ stands for an inclination angle of the tapered peripheral surface with respect to the axis center of the valve disc and $\theta_2$ stands for an inclination angle of the inversely tapered peripheral surface with respect to the axis center of the valve disc.

Preferably, the relationship $H_3 < H_4$ is satisfied, where $H_3$ stands for a distance between the first peripheral surface and the annular protrusion and $H_4$ stands for a distance between the first surface and the second surface.

In this case, it is preferred that the reduction ratio of $H_3$ is set to become higher than the reduction ratio of $H_4$ during the closing operation of the valve disc.

Furthermore, with the above-described mode for carrying out the present invention, it is preferred that the annular protrusion has a second peripheral surface that is connected to the second surface and can face the first peripheral surface and an annular surface connected to the second peripheral surface and parallel to the second surface.

In those cases, it is preferred that the first surface and the second surface is parallel to each other.

In those cases, it is preferred that the sealing member protrudes from one of the first surface and the second surface toward the other.

With the above-described valve according to the present invention, because the rapid fluid flow acting upon the sealing member is restricted by the throttle section, durability of the sealing member can be increased and adequate sealing capability of the sealing member can be maintained when the difference in pressure between the primary side and secondary side is high or low, that is, regardless of the difference in pressure between the primary side and secondary side.

DETAILED DESCRIPTION

A valve of the preferred embodiment of the present invention will be explained below with reference to the appended drawings. The valve shuts a flow passage for a fluid such as a high-pressure gas via a sealing member and is assembled mainly in a piping system of hydrogen gas or oxygen gas of a fuel cell system. In the explanation provided below, the structure surrounding the sealing member will be explained in greater detail with a pilot-type electromagnetic valve as an example. FIG. 1 to FIG. 15 show schematically the left half, with respect to a $Y_1$-$Y_2$ axis as a central axis, of the structure surrounding the sealing member.

EMBODIMENT 1

Figure 16:
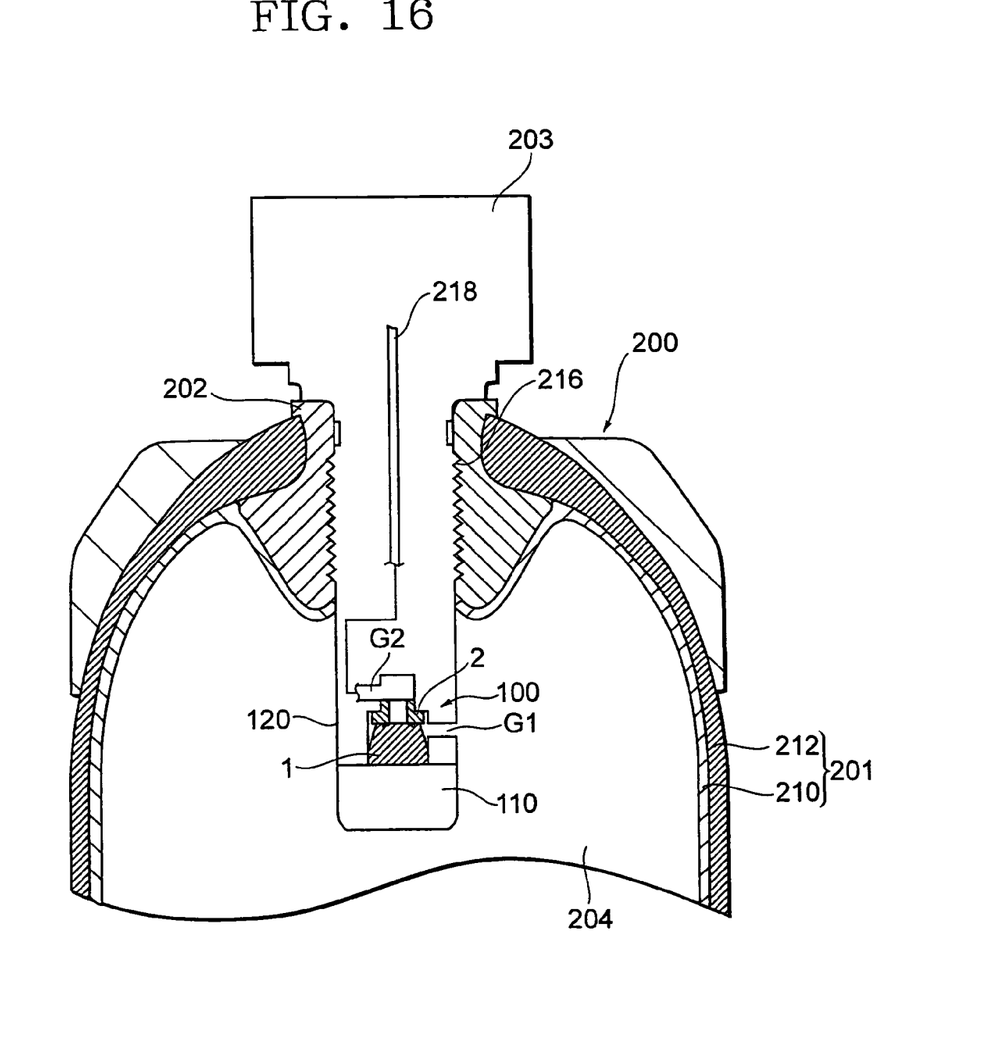
FIG. 16 is a schematic cross-sectional view illustrating an example of a high-pressure tank using an embodiment of the valve according to the present invention.

FIG. 16, as mentioned above, is a schematic cross-sectional view illustrating an example of a high-pressure tank using an embodiment of the valve according to the present invention. A high-pressure tank 200 comprises a tank body 201 having as a whole an almost cylindrical shape, a sleeve 202 (mouthpiece) provided at one end or both ends of the tank body in the longitudinal direction thereof, and a valve assembly 203 detachably attached to the sleeve 202. The inside of the tank body 201 serves as a storage space 204 for retaining a fluid such as a gases of various types, for example, natural gas or hydrogen gas, under a high pressure. When such a high-pressure tank 200 is employed in a fuel cell system, for example, hydrogen gas at 35 MPa or 70 MPa or CNG Compressed Natural Gas) at 20 MPa is sealed and held inside the storage space 204.

The below-described valve 100 having a valve disc 1, a valve seat 2, and a sealing member 5 that is the object of the present invention operates with a fluid such as gas at a pressure of at least 1 MPa. The valve 100 preferably operates with a fluid at a pressure of 3 MPa and higher, even more preferably at a pressure of 35 MPa and higher.

The tank body 201 has a double-wall structure in which an inner liner 210 (inner shell) having gas barrier properties is coated on the outside with a shell 212 (outer shell) composed of a FRP. The liner 210 is formed, for example, from a resin such as high-density polyethylene. However, the tank body 201 may be also a metal container made, for example, from an aluminum alloy. Furthermore, the gas retained inside the tank body 201 can be supplied to the storage space 204 from an external gas line via a valve assembly 203 attached to the sleeve (mouth piece) 202 and released to the external gas line via this valve assembly 203.

The region between the sleeve 202 and tank 200 is airtightly sealed with a plurality of sealing members (not shown in the figures). Furthermore, an external thread 216 is formed on the outer peripheral surface of the open portion of the sleeve 202. The valve assembly 203 is connected by screwing to the open portion of the sleeve 202 via the external thread 216. Furthermore, a flow passage 218 to connect the external gas line to the storage space 204 is provided in the valve assembly 203.

A variety of pipe elements such as valves and couplings are integrally assembled in the valve assembly 203. For example, the valve assembly 203 comprises an electromagnetic valve 100 serving as a main valve disposed on the flow passage 218 and a regulator (valve; not shown in the figure) disposed on the flow passage 218 in series with the electromagnetic valve 100. The electromagnetic valve 100 and regulator may be also arranged in reverse order, and the electromagnetic valve 100 may be installed and connected to the sleeve 202 separately from the valve assembly 203, rather that being assembled integrally with the valve assembly 203.

Figure 17:
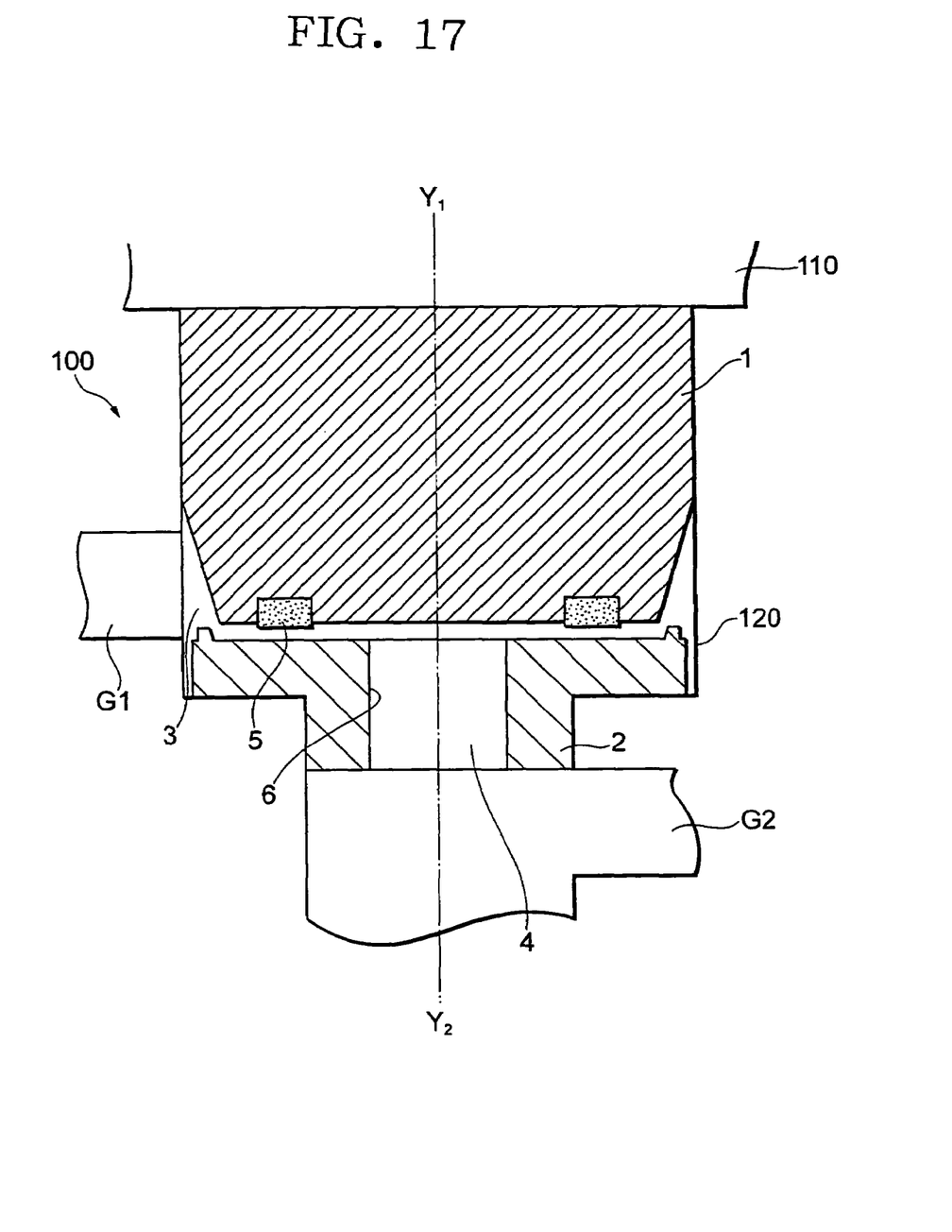
FIG. 17 is an enlarged cross-sectional view illustrating the main portion of the tank shown in FIG. 16.

FIG. 17 is an enlarged cross-sectional view illustrating the main portion shown in FIG. 16. In FIG. 17 and the below-described FIG. 1 to FIG. 15, the components are arranged so that that the side of the storage space 204, that is, the upstream side, is in the upper part of the figure.

As shown in FIG. 16 and FIG. 17, the electromagnetic valve 100 comprises a valve disc 1 connected to a solenoid unit 110 for driving, a valve seat 2 disposed opposite the valve disc 1 at a certain distance therefrom, and a sealing member 5 from an elastic material provided at the valve disc 1. When driven by the solenoid unit 110, the valve disc 1 is moved to and from the valve seat 2. If the valve disc 1 is brought into close contact with the valve seat 2 via the sealing member 5 and a close contact state (closed valve state) is assumed, the storage space 204 and flow passage 218 are isolated and sealed.

In the electromagnetic valve 100, the outer shell thereof is composed of a housing 120. In the housing 120, an inflow port G1 is provided upstream of the valve disc 1 and an outflow port G2 connected to the fluid flow passage 218 is provided downstream of the valve seat 2. The fluid that flows through the electromagnetic valve 100 flows in from a high-pressure side 3 on a primary side via the inflow port G1, passes through the flow passage formed between the valve disc 1 and valve seat 2, and flows out from the low-pressure side 4 on the secondary side to the outflow port G2.

Figure 1:
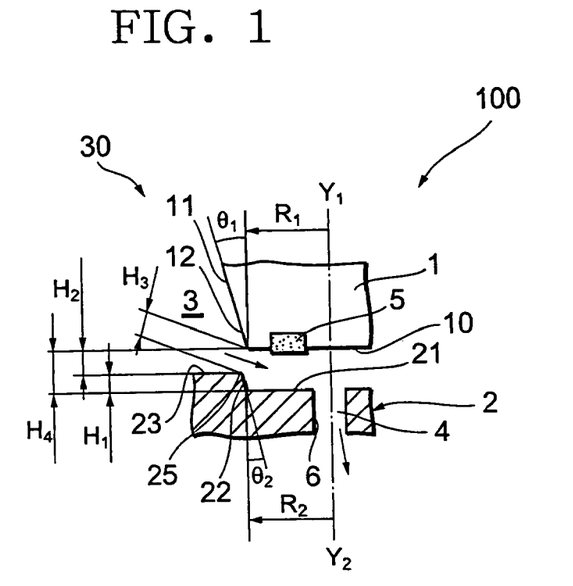
FIG. 1 is an explanatory drawing showing in a cross-sectional view the general features of the valve according to Embodiment 1.

FIG. 1 is schematic cross-sectional view of the electromagnetic valve 100 showing on an enlarged scale the main components shown in FIG. 17. As shown in FIG. 1, the valve disc 1, valve seat 2, and sealing member 5 are disposed coaxially on the $Y_1$-$Y_2$ axis. The passage 6 connected to the outflow port is formed on the $Y_1$-$Y_2$ axis.

The valve disc 1 is formed from a non-elastic substance (material) such as a metal and can be moved in the direction of the $Y_1$-$Y_2$ axis, which is a central axis thereof. The valve disc 1 comprises a front surface 10 (first surface) perpendicular to the $Y_1$-$Y_2$ axis and an inclined surface 11 (first peripheral surface or tapered peripheral surface) integrally connected in a tapered configuration from the front surface 10 to the base side. The valve disc 1 has a truncated cone shape as a whole. The front surface 10 of the valve disc 1 has a radius $R_1$ from the $Y_1$-$Y_2$ axis as a center, and the inclined surface 11 forms the prescribed angle $\theta_1$ with the $Y_1$-$Y_2$ axis.

The valve seat 2, similarly to the valve disc 1, is formed from a non-elastic substance (material) such as a metal and, as a whole, is formed from an almost annular member provided with a step. The valve seat 2 comprises a seat surface 21 (second surface) that is parallel to the front surface 10 of the valve disc 1 and faces it, a tilted surface 22 (second peripheral surface or inversely tapered peripheral surface) that is integrally connected to the seat surface 21 and inclined toward the valve disc 1, and a non-seat surface 23 that is integrally connected to the tilted surface 22 and parallel to the seat surface 21. The non-seat surface 23 is set at a distance $H_1$ in the $Y_1$-$Y_2$ axis direction from the seat surface 21. An annular protrusion that protrudes from the seat surface 21 to the front surface 10 is constituted by the tilted surface 22 and non-seat surface 23, and this annular protrusion faces the inclined surface 11.

The seat surface 21 of the valve seat 2 has a radius $R_2$ from the $Y_1$-$Y_2$ axis as a center, and the tilted surface 22 thereof forms the prescribed angle $\theta_2$ with the $Y_1$-$Y_2$ axis. In this case, the radius $R_2$ is set slightly larger than the radium $R_1$, and the angle $\theta_2$ is set somewhat smaller than the angle $\theta_1$. A throttle section 30 where the flow passage on the outer side in the radial direction of the sealing member 5 is narrowed, of the entire flow passage formed between the valve disc 1 and valve seat 2, is defined by those shape parameters ($\theta_1$, $\theta_2$, $R_1$, $R_2$) of the valve disc 1 and valve seat 2.

The throttle section 30 is configured to narrow the flow passage inside the valve 100 leading from the inflow port G1 (high-pressure side 3) to the outflow port G2 (low-pressure side 4) over the circumferential direction on the upstream of the vicinity of the sealing member 5. That is, the flow passage in the throttle section 30 is set to have a cross section area less than the flow passage between the front surface 10 and seat surface 21. The throttle section 30 functions as a pressure loss section where the fluid flow is obstructed by partially reducing the cross section area of the flow passage inside the valve 100.

A specific region defining the throttle section 30 is a crossing section 25 of the tilted surface 22 and non-seat surface 23 on the side of the valve seat 2. On the other hand, on the side of the valve disc 1, a region defining the throttle section 30 is set as a region 12 of the inclined surface 11 positioned at the shortest distance from the crossing section 25, but this region 12 varies according to the position of the valve disc 1.

Figure 3:
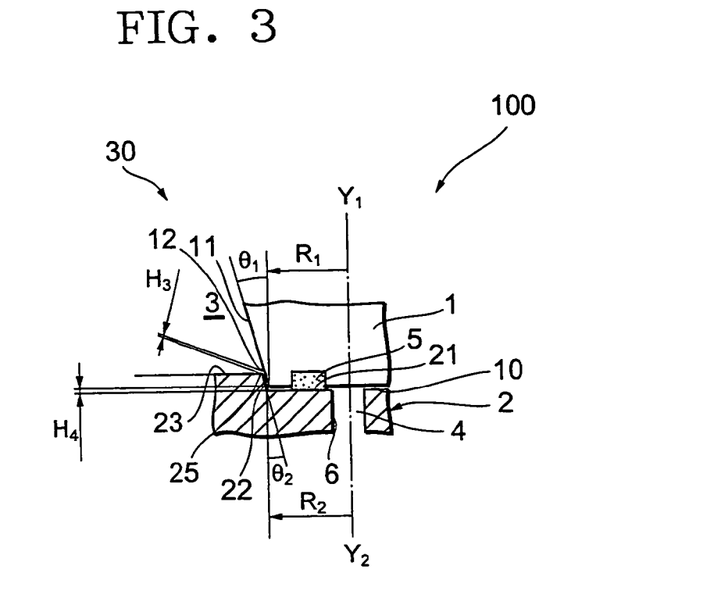
FIG. 3 is an explanatory drawing showing in a cross-sectional view the general features of the valve according to Embodiment 1.

Thus, as shown in FIG. 1, when the valve is open and the valve disc 1 and valve seat 2 are sufficiently spaced apart, the region 12 on the side of the valve disc 1, which defines the throttle section 30, is set as a crossing section of the front surface 10 and the inclined surface 11. On the other hand, when the valve is opened (during closing operation) and the valve disc 1 is comparatively close to the valve seat 2, as shown in FIG. 3, the region 12 on the side of the valve disc 1, which defines the throttle section 30, is set as the prescribed region of the inclined surface 11 crossed by a perpendicular dropped from the crossing section 25 of the valve seat 2 to the inclined surface 11.

In the explanation provided hereinbelow, the distance between the crossing section 25 of the valve seat 2 defining the throttle section 30 and the region 12 of the valve disc 1 will be taken as $H_3$. For the convenience of explanation, $H_3$ will sometimes mean the flow passage (gap) narrowed by the throttle section 30, or the size thereof or the cross section surface area of the flow passage. Similarly, the distance $H_4$ between the front surface 10 of the valve disc 1 and the seat surface 21 of the valve seat 2 is obtained by adding the aforementioned $H_1$ to the distance $H_2$ between the front surface 10 of the valve disc 1 and the non-seat surface 23. Similarly, for the convenience of explanation, $H_4$ will sometimes mean the flow passage (gap between the front surface 10 and the seat surface 21) in close proximity the sealing member 5 apart from the throttle section 30, or the size thereof or the cross section surface area of the flow passage.

Because the throttle section 30 is formed described above, when the valve is open as shown in FIG. 1, $H_3$ is set less than $H_4$. Furthermore, during the closing operation of the valve disc 1 illustrated by FIG. 2 and FIG. 3, $H_3$ and $H_4$ decrease, while maintaining the $H_3 < H_4$ relationship, but $H_3$ is set so as to become narrower at a rate greater than that of $H_4$. Thus, the settings are such that the reduction ratio of $H_3$ per unit time is larger than the reduction ratio of $H_4$ during the closing operation of the valve disc 1. As a result, during the closing operation of the valve disc 1, a sufficient pressure loss is generated in the throttle section 30 and the fluid force acting on the sealing member 5 is relaxed.

The sealing member 5 is formed from an elastic material such as rubber and has an annular shape with the $Y_1$-$Y_2$ axis as a center. The sealing member 5 is provided near the throttle section 30 and protrudes from the front surface 10 of the valve disc 1 toward the seat surface 21. The sealing member 5 is so configured that the surface thereof that faces the seat surface 21 of the valve seat 2 is a flat surface parallel thereto. When the valve is closed, this surface is brought into the close contact with the seat surface 21, shutting the flow passage. The sealing member 5 provides for air-tight sealing between the high-pressure side 3 and low-pressure side 4.

The operation of the electromagnetic valve 100 configured as described before will be explained below with reference to FIG. 1 to FIG. 4. When the valve is opened as shown in FIG. 1, the fluid flows from the high-pressure side 3 to the low-pressure side 4 through $H_3$ and $H_4$. The flow rate of the fluid in this process mainly depends on $H_3$.

Figure 2:
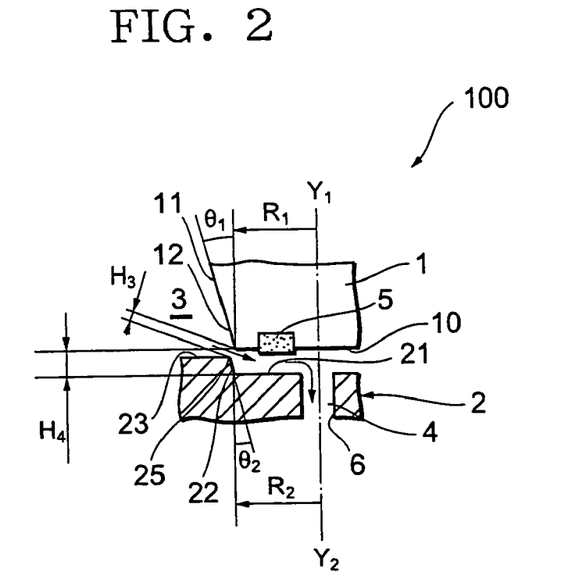
FIG. 2 is an explanatory drawing showing in a cross-sectional view the general features of the valve according to Embodiment 1.

As shown in FIG. 2, after a transition is made to the closing operation of the valve disc 1, the fluid undergoes pressure loss and the flow rate thereof is inhibited when it passes through $H_3$ that was narrowed faster than $H_4$ and then flows into $H_4$. On the other hand, because the $H_3 < H_4$ relationship is maintained, the flow velocity in $H_4$ decreases by comparison with that in $H_3$. Therefore, the force with which the fluid acts upon the sealing member 5 positioned in $H_4$ is reduced by comparison with that acting without the throttle section 30. Note that the flow rate of the fluid at this time mainly depends on $H_3$.

After the closing operation of the valve disc 1 has been further advanced to the final stage, as shown in FIG. 3, the sealing member 5 abuts against the seat surface 21 of the valve seat 2, but at this time the fluid undergoes a very large pressure loss and the flow rate thereof is greatly restricted when it passes through $H_3$. Therefore, the force with which the fluid acts upon the sealing member 5 is greatly reduced by comparison with that acting without the throttle section 30. Furthermore, when the pressure on the contact surface of the sealing member 5 and seat surface 21 becomes equal to or higher than the pressure of the high-pressure side 3, an air-tight seal is provided between the high-pressure side 3 and low-pressure side 4.

Thus, in the process of closing the valve disc shown in FIG. 2 and FIG. 3, the force of the fluid acting upon the sealing member 5 is gradually relaxed. Therefore, durability of the sealing member 5 can be advantageously increased. Furthermore, in the closed state shown in FIG. 4, the front surface 10 of the valve disc 1 and the seat surface 21 of the valve seat 2 come into close contact, flattening the squeeze of the sealing member 5 and providing for air-tight and reliable sealing between the high-pressure side 3 and low-pressure side 4. At this time, the settings are such that $H_4$ becomes zero or almost zero and a slight $H_3$ is present. The settings may be also such that the crossing section 25 on the side of the valve seat 2 is brought into contact with the inclined surface 11 of the valve disc 1 and $H_3$ becomes zero.

Furthermore, during the closing operation of the valve disc 1 shown in FIG. 2, the contact flatness of the valve disc 1 against the valve seat 2 and the concentricity thereof are increased based on the principle of self centering induced by the fluid flow. More specifically, as $H_3$ decreases following the closing operation of the valve disc 1, the valve disc 1 is moved by the fluid in the $Y_1$ direction of the $Y_1$-$Y_2$ axis and to the central axis. As a result, the closing operation is performed, while automatically providing for concentricity and maintaining the contact flatness of the valve disc 1 against the valve seat 2, and the movement speed in this closing operation is reduced.

As a result, the closing operation of the valve disc 1 can be performed with good stability and the sealing member 5 and valve seat 2 can be brought into contact, while relaxing the contact speed, as shown in FIG. 3. Therefore, when the sealing member 5 shown in FIG. 3 and FIG. 4 is in a state of contact with the valve seat 2, the sealing member 5 contacts with against the valve seat 2 by a uniform force in the circumferential direction thereof, and in this aspect, a contribution can be made to improving the durability of the sealing member 5.

Figure 4:
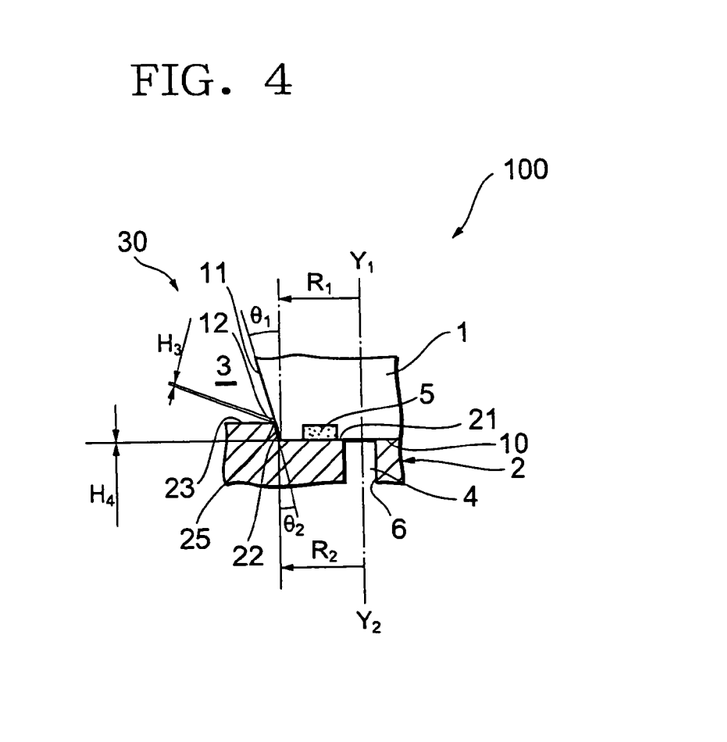
FIG. 4 is an explanatory drawing showing in a cross-sectional view the general features of the valve according to Embodiment 1.

Furthermore, in the electromagnetic valve 100 of the present embodiment, the force of the fluid acting upon the sealing member 5 is also relaxed by the throttle section 30 during the opening operation of the valve disc, that is, when the valve disc 1 is operated according to the sequence of FIG. 4→FIG. 3→FIG. 2→FIG. 1 that is not described herein in detail. Furthermore, in the open state shown in FIG. 1, pressure loss is effectively avoided and a sufficient flow rate is ensured in the flow passage inside the valve.

The electromagnetic valves 100 of other embodiments of the present invention will be explained below with reference to the appended drawings. The explanation will be focused on the difference between Embodiment 1 and each other embodiment. Components identical to the above-described components are assigned with identical reference numerals and the explanation thereof is omitted.

EMBODIMENT 2

Figure 5:
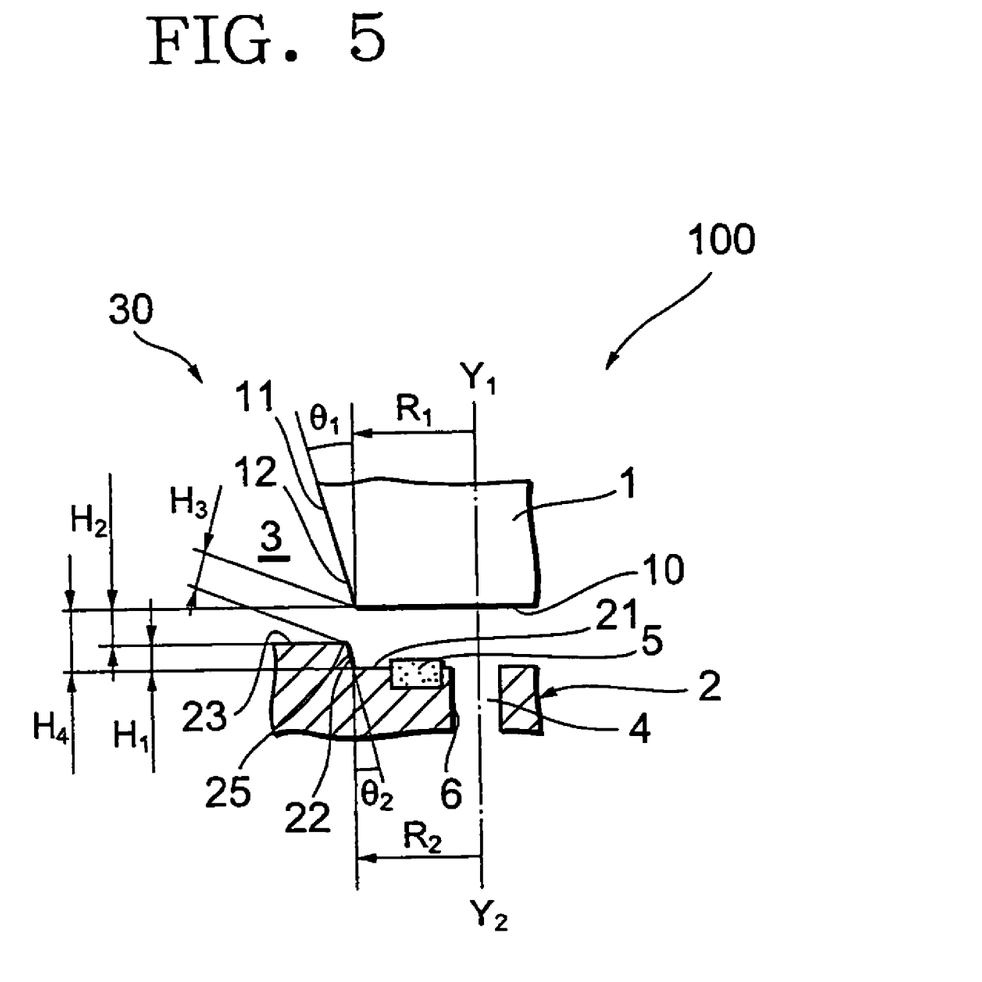
FIG. 5 is an explanatory drawing showing in a cross-sectional view the general features of the valve according to Embodiment 2.

As shown in FIG. 5, in the electromagnetic valve 100 of Embodiment 2, the sealing member 5 of Embodiment 1 is provided at the seat surface 21 of the valve seat 2. The arrangement position of the sealing member 5 in Embodiment 2 is the opposite of that in Embodiment 1, and the sealing member 5 is so configured that it can be brought into close contact with the front surface 10 of the valve disc 1. Therefore, in this embodiment, the operation and effect identical to those of Embodiment 1 can be attained too.

EMBODIMENT 3

Figure 6:
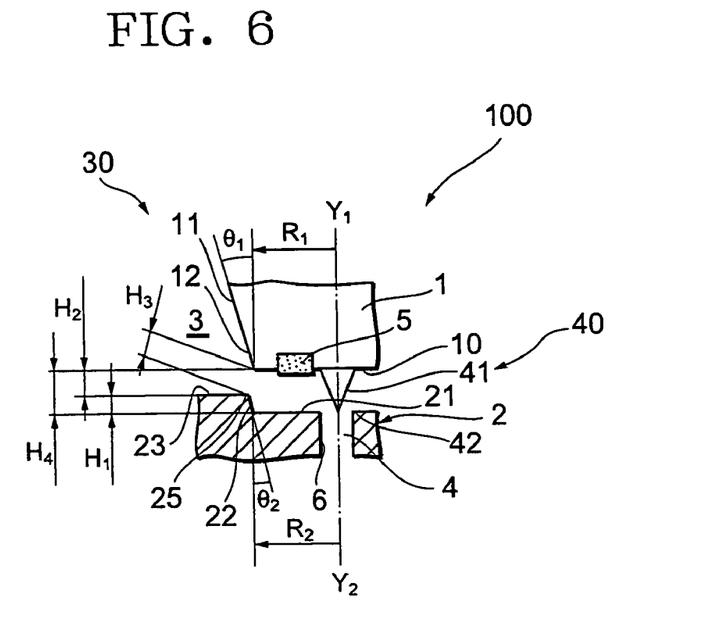
FIG. 6 is an explanatory drawing showing in a cross-sectional view the general features of the valve according to Embodiment 3.

As shown in FIG. 6, in addition to the structural elements of Embodiment 1, the electromagnetic valve 100 of Embodiment 3 comprises a throttle section 40 that narrows the flow passage, downstream of the sealing member 5 provided between the valve disc 1 and valve seat 2. This downstream throttle section 40 has the same function as the upstream throttle section 30 of Embodiment 1, but is mainly defined by a needle-like protruding section 41 protruding from the front surface 10 of the valve disc 1. The protruding section 41 which axis corresponds to the $Y_1$-$Y_2$ axis is configured to be received in the passage 6.

In the downstream throttle section 40, the tilted surface 11 of the protruding section 41 corresponds to the inclined surface, in the upstream throttle section 30, and the annular angular section 42 constituting the passage 6 corresponds to the crossing section 25 of the valve seat 2 in the upstream throttle section 30. The flow passage narrowed by the downstream throttle section 40 is so set that, similarly to the relationship of $H_3$ and $H_4$, narrowing preferentially proceeds in the flow passage ($H_4$) in close proximity to the sealing member 5 during the closing operation of the valve disc 1. Furthermore, the cross section area of the flow passage narrowed by the downstream throttle section 40 is set smaller than the cross section area of the passage 6, and is so set that during the closing operation of the valve disc 1, it also decreases, while maintaining the aforementioned relationship.

In the present embodiment, in addition to the operation and effect of Embodiment 1, the pressure loss can be also generated in the throttle section 40 downstream of the sealing member 5, in particular during the closing operation of the valve disc 1. Therefore, the force of the fluid acting upon the sealing member 5 can be relaxed even more significantly. Therefore, durability of the sealing member 5 can be further improved.

EMBODIMENT 4

Figure 7:
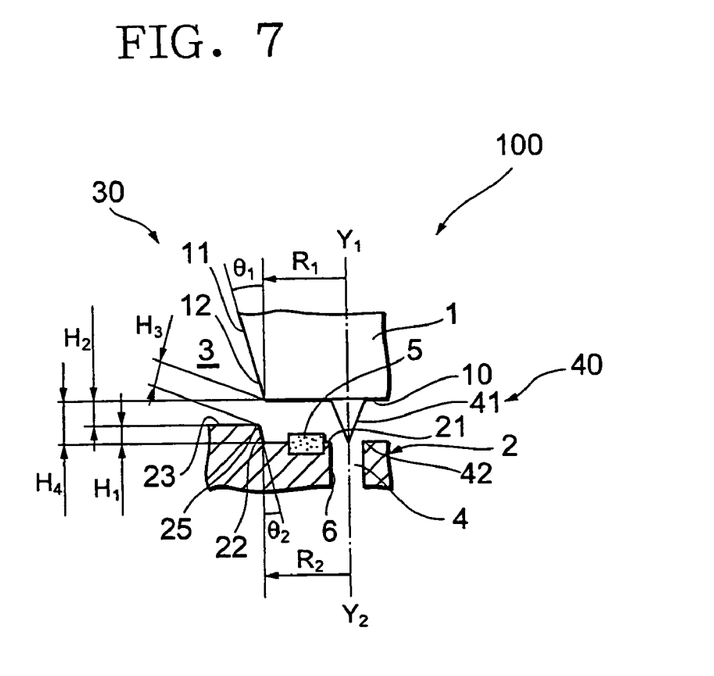
FIG. 7 is an explanatory drawing showing in a cross-sectional view the general features of the valve according to Embodiment 4.

As shown in FIG. 7, in the electromagnetic valve 100 of Embodiment 4, the sealing member 5 of Embodiment 3 is provided at the seat surface 21 of the valve seat 2. In the present embodiment, similarly to Embodiment 3, the throttle sections 30, 40 are present in front and behind, that is, upstream and downstream of the sealing member 5. Therefore, the operation and effect similar to those of Embodiment 3 can be attained.

EMBODIMENT 5

Figure 8:
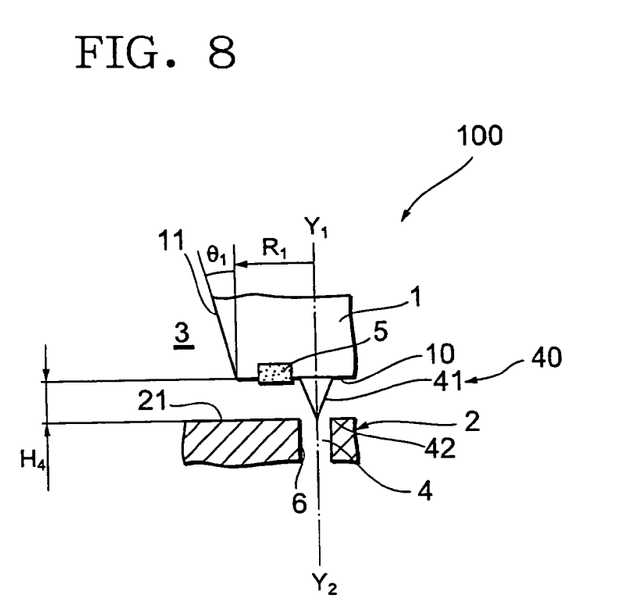
FIG. 8 is an explanatory drawing showing in a cross-sectional view the general features of the valve according to Embodiment 5.

As shown in FIG. 8, in the electromagnetic valve 100 of Embodiment 5, the upstream throttle section 30 is omitted from the structure of Embodiment 3 shown in FIG. 6. Therefore, when the valve is opened, as shown in FIG. 8, the fluid passes from the high-pressure side 3 through $H_4$ and then through the flow passage narrowed by the downstream throttle section 40 and flows to the low-pressure side 4.

In the present embodiment, the pressure loss is generated via the operation of only the throttle section 40 located downstream of the sealing member 5 and the flow rate of the fluid flowing into $H_4$ can be restricted. However, the force of the fluid acting upon the sealing member 5 can be relaxed in the same manner as in Embodiment 1. Therefore, in the present embodiment, too, the operation and effect identical to those of Embodiment 1 can be attained.

EMBODIMENT 6

Figure 9:
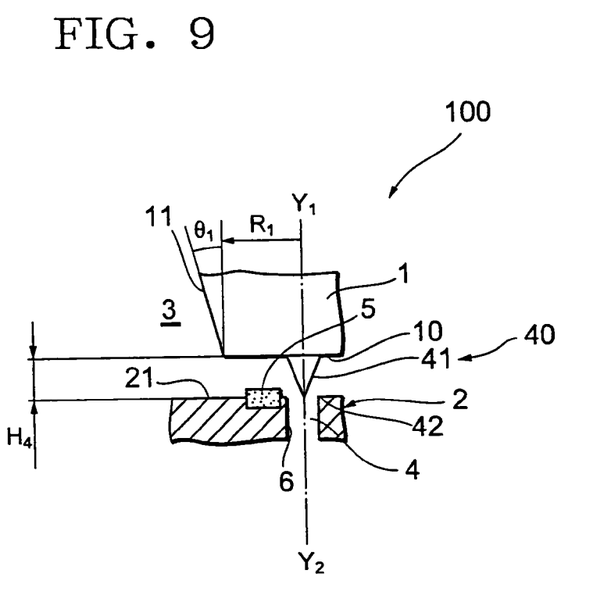
FIG. 9 is an explanatory drawing showing in a cross-sectional view the general features of the valve according to Embodiment 6.

As shown in FIG. 9, in the electromagnetic valve 100 of Embodiment 6, the sealing member 5 of Embodiment 5 is provided on the seat surface 21 of the valve seat 2. The arrangement position of the sealing member 5 in Embodiment 6 is the opposite of the arrangement position in Embodiment 5, and the operation and effect attained in Embodiment 6 are identical to those of Embodiment 5.

EMBODIMENT 7

Figure 10:
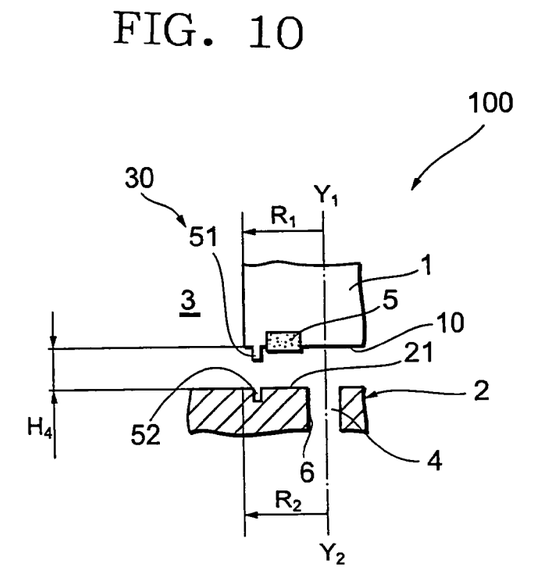
FIG. 10 is an explanatory drawing showing in a cross-sectional view the general features of the valve according to Embodiment 7.

As shown in FIG. 10, in the electromagnetic valve 100 of Embodiment 7, the throttle section 30 different from that of Embodiment 1 is formed. The throttle section 30 of the present embodiment is defined by the annular convex portion 51 formed so as to protrude downward from the front surface 10 of the valve disc 1 and a concave portion 52 formed annularly in the seat surface 21 of the valve seat 2 so as to face the convex portion 51 and to be able to accommodate it.

With the throttle section 30 of the present embodiment, because the pressure loss can be generated by narrowing the flow passage that is located upstream of the sealing member 5, or near the sealing member 5, the force of the fluid acting upon the sealing member 5 can be relaxed and durability of the sealing member 5 can be increased in almost the same manner as in the above-described embodiments. Furthermore, the shape elements defining the throttle section 30 may have an inverted configuration between the valve disc 1 and valve seat 2, that is, the concave portion 52 may be formed in the valve disc 1 and the convex portion 51 may be formed in the valve seat 2.

EMBODIMENT 8

Figure 11:
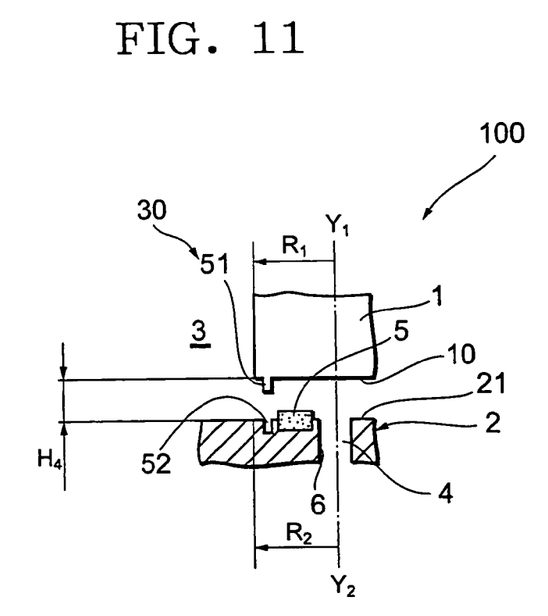
FIG. 11 is an explanatory drawing showing in a cross-sectional view the general features of the valve according to Embodiment 8.

As shown in FIG. 11, in the electromagnetic valve 100 of Embodiment 8, the sealing member 5 of Embodiment 7 is provided at the seat surface 21 of the valve seat 2. The arrangement position of the sealing member 5 in Embodiment 8 is the opposite of the arrangement position in Embodiment 7, and the operation and effect attained in Embodiment 8 are identical to those of Embodiment 7.

EMBODIMENT 9

Figure 12:
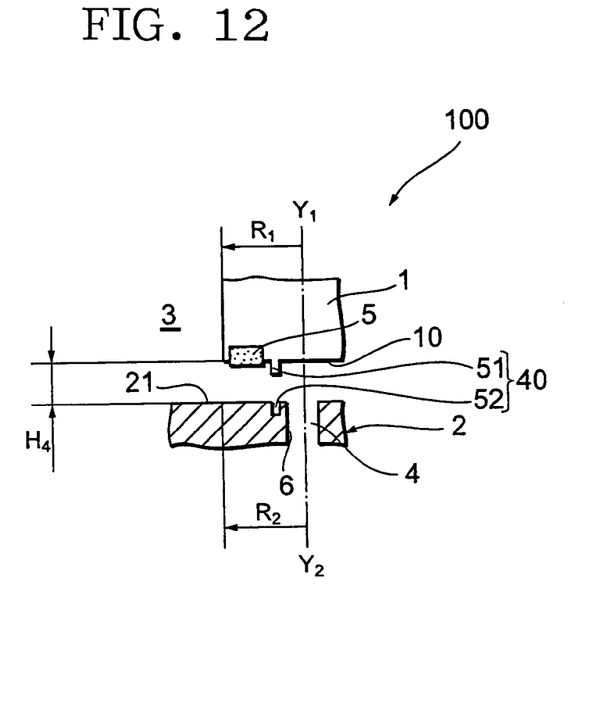
FIG. 12 is an explanatory drawing showing in a cross-sectional view the general features of the valve according to Embodiment 9.

As shown in FIG. 12, in the electromagnetic valve 100 of Embodiment 9, the throttle section 30 of Embodiment 7 shown in FIG. 10 is provided downstream of the sealing member 5. With the throttle section 40 of the present embodiment, because the pressure loss can be generated by narrowing the flow passage that is located downstream of the sealing member 5, or near the sealing member 5, the force of the fluid acting upon the sealing member 5 can be relaxed and durability of the sealing member 5 can be increased in almost the same manner as in Embodiment 7.

EMBODIMENT 10

Figure 13:
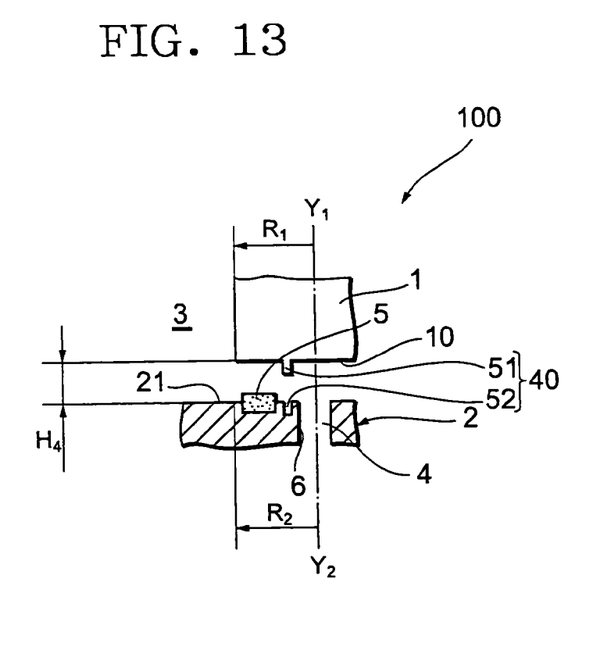
FIG. 13 is an explanatory drawing showing in a cross-sectional view the general features of the valve according to Embodiment 10.

As shown in FIG. 13, in the electromagnetic valve 100 of Embodiment 10, the sealing member 5 of Embodiment 9 is provided at the seat surface 21 of the valve seat 2 and the arrangement position thereof is the opposite of the arrangement position in Embodiment 9. Therefore, according to this embodiment, the operation and effect of Embodiment 9 can be attained too.

EMBODIMENT 11

Figure 14:
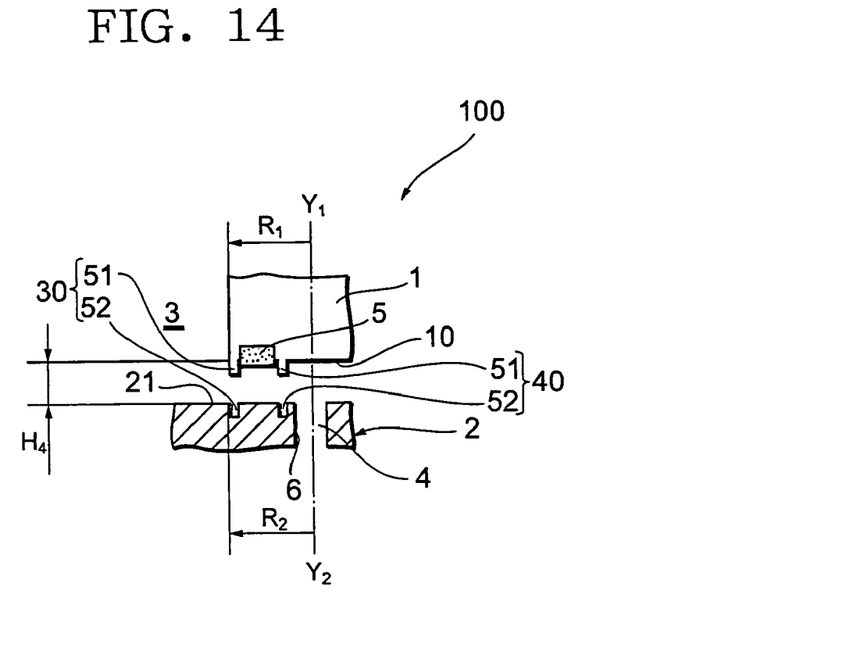
FIG. 14 is an explanatory drawing showing in a cross-sectional view the general features of the valve according to Embodiment 11.

As shown in FIG. 14, the electromagnetic valve 100 of Embodiment 11 is equivalent to combination of Embodiment 7 shown in FIG. 10 and Embodiment 9 shown in FIG. 12. Thus, in the electromagnetic valve 100 of the present embodiment, the throttle sections 30, 40 having convex section 51 and concave section 52 are provided both upstream and downstream of the sealing member 5, and in this case the convex section 51 is formed on the valve disc 1. According to this embodiment, the force of the fluid acting upon the sealing member 5 can be relaxed to a greater extent and durability of the sealing member 5 can be further increased by comparison with those obtained with a single throttle section.

EMBODIMENT 12

Figure 15:
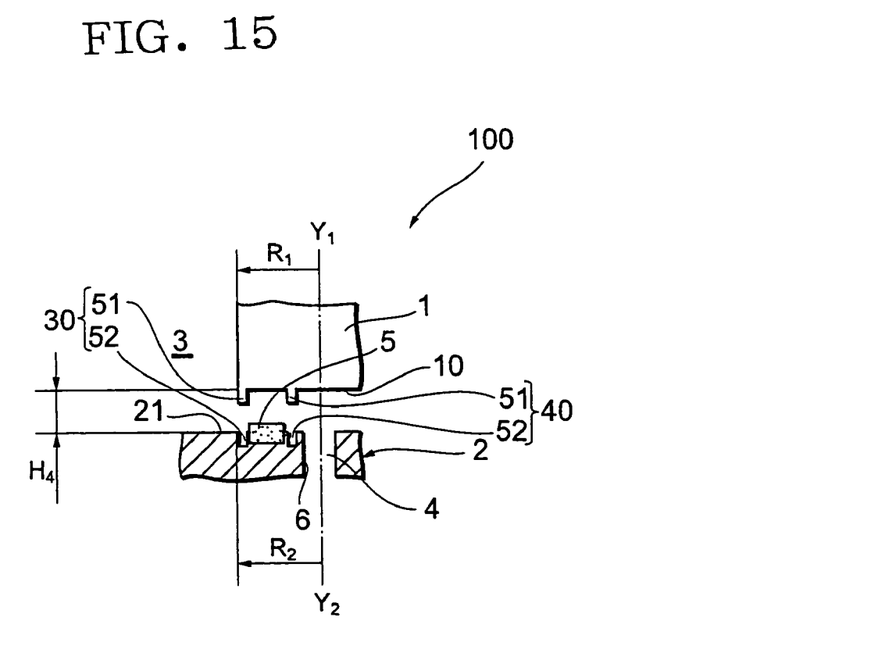
FIG. 15 is an explanatory drawing showing in a cross-sectional view the general features of the valve according to Embodiment 12.

As shown in FIG. 15, in the electromagnetic valve 100 of Embodiment 12, the sealing member 5 of Embodiment 11 is provided at the seat surface 21 of the valve seat 2 and the arrangement thereof is the opposite of the arrangement position in Embodiment 11. Therefore, according to this embodiment, the operation and effect of Embodiment 11 can be attained too.

We claim:

1. A valve in which a valve disc and a valve seat are brought into close contact via an annular sealing member composed of an elastic material and provided at said valve disc or said valve seat, wherein
    the valve is substantially circular in structure about the central axis;
    said valve disc comprises a first surface that is orthogonal to the central axis facing said valve seat and a first peripheral surface connected to said first surface,
    said valve seat comprises a second surface that is orthogonal to the central axis facing said first surface and an annular protrusion protruding from said second surface toward said first peripheral surface in a position facing said first peripheral surface,
    the annular protrusion has a second peripheral surface that is connected to the second surface and is configured to face the first peripheral surface,
    the first peripheral surface is composed of a tapered peripheral surface,
    the second peripheral surface is composed of an inversely tapered peripheral surface,
    said sealing member is provided at one of said first surface and said second surface and configured so that said sealing member can be brought into close contact with the other of said first surface and said second surface,
    the sealing member is positioned radially inward of the tapered peripheral surface and the inversely tapered peripheral surface in the direction of the central axis of the valve and is wholly integrated into the first or second surface,
    the sealing member is positioned at a downstream side from the tapered peripheral surface and inversely tapered peripheral surface in a flow direction of fluid, and
    a flow passage between said first peripheral surface and said annular protrusion comprises a flow passage that is set to have a cross section area that is preferentially reduced with respect to that of a flow passage between said first surface and said second surface during the closing of the valve.

2. The valve according to claim 1, wherein in said flow passage that is set to have a reduced cross section area, the ratio of reduction of the cross section area that follows the closing operation of said valve disc is larger than that in the flow passage between said first surface and said second surface.

3. The valve according to claim 1, wherein
    said annular protrusion has a second peripheral surface that is connected to said second surface and can face said first peripheral surface; and
    said flow passage that is set to have a reduced cross section area is at least part of the flow passage between said first peripheral surface and said second peripheral surface.

4. The valve according to claim 3, wherein said
    first peripheral surface is composed of the tapered peripheral surface,
    and said second peripheral surface is composed of the inversely tapered peripheral surface inclined toward said valve disc.

5. The valve according to claim 4, wherein the relationship $R_1 < R_2$ is satisfied, where $R_1$ stands for a distance to the crossing section of said first surface and said tapered peripheral surface and $R_2$ stands for a distance to the crossing section of said second surface and said inversely tapered peripheral surface.

6. The valve according to claim 4, wherein the relationship $\theta_1 > \theta_2$ is satisfied, where $\theta_1$ stands for an inclination angle of said tapered peripheral surface with respect to the axis center of said valve disc and $\theta_2$ stands for an inclination angle of said inversely tapered peripheral surface with respect to the axis center of said valve disc.

7. The valve according to claim 1, wherein the relationship $H_3 < H_4$ is satisfied, where $H_3$ stands for a distance between said first peripheral surface and said annular protrusion and $H_4$ stands for a distance between said first surface and said second surface.

8. The valve according to claim 7, wherein the reduction ratio of $H_3$ is set to become higher than the reduction ratio of $H_4$ during closing operation of said valve disc.

9. The valve according to claim 1, wherein
    said annular protrusion has a second peripheral surface that is connected to said second surface and can face said first peripheral surface, and
    an annular surface connected to said second peripheral surface and parallel to said second surface.

10. The valve according to claim 1, wherein said first surface and said second surface are parallel to each other.

11. The valve according to claim 1 wherein said sealing member protrudes from one of said first surface and said second surface toward the other.

12. The valve according to claim 1, wherein the flow direction of fluid that passes said throttle section is configured to comply with the closing direction of the valve disc.

13. The valve according to claim 1, wherein the tapered peripheral surface maintains a first substantially constant angle relative to a closing direction of the valve, and the inversely tapered peripheral surface maintains a second substantially constant angle relative to the closing direction.

14. The valve according to claim 1, wherein the sealing member protrudes from the valve disk or the valve seat.

15. The valve according to claim 1, wherein the valve is an electromagnetic valve.

16. The valve according to claim 1, wherein fluid flows from a position that is radially outward toward a position that is radially inward with respect to the central axis.

* * * * *